US012693305B2

(12) United States Patent
Hay et al.

(10) Patent No.: US 12,693,305 B2
(45) Date of Patent: Jul. 28, 2026

(54) TRAVEL SPEED MEASUREMENT AND MOTION ANALYSIS OF HIGH-SPEED LASER MOTION SYSTEMS

(71) Applicant: Edison Welding Institute, Inc., Columbus, OH (US)

(72) Inventors: Jacob C. Hay, Columbus, OH (US); Ron Aman, Columbus, OH (US); Stanley L. Ream, Columbus, OH (US)

( * ) Notice: Subject to any disclaimer, the term of this patent is extended or adjusted under 35 U.S.C. 154(b) by 726 days.

(21) Appl. No.: 18/144,509

(22) Filed: May 8, 2023

(65) Prior Publication Data

US 2023/0358778 A1     Nov. 9, 2023

Related U.S. Application Data

(60) Provisional application No. 63/339,824, filed on May 9, 2022.

(51) Int. Cl.

| | |
|---|---|
| *G01P 3/68* | (2006.01) |
| *B22F 10/80* | (2021.01) |
| *B22F 12/41* | (2021.01) |
| *B29C 64/268* | (2017.01) |
| *B29C 64/386* | (2017.01) |
| *B33Y 50/00* | (2015.01) |
| *B22F 10/28* | (2021.01) |
| *B29C 64/153* | (2017.01) |

(52) U.S. Cl.
CPC ................ *G01P 3/68* (2013.01); *B22F 10/80* (2021.01); *B22F 12/41* (2021.01); *B29C 64/268* (2017.08); *B29C 64/386* (2017.08); *B33Y 50/00* (2014.12); *B22F 10/28* (2021.01); *B29C 64/153* (2017.08)

(58) Field of Classification Search
None
See application file for complete search history.

(56) References Cited

U.S. PATENT DOCUMENTS

| | | | |
|---|---|---|---|
| 2017/0219808 A1 | 8/2017 | Mori et al. | |
| 2018/0348734 A1* | 12/2018 | Berlier | ............... G05B 19/4097 |
| 2019/0009358 A1 | 1/2019 | Vorontsov | |
| 2020/0209107 A1 | 7/2020 | Ream et al. | |

FOREIGN PATENT DOCUMENTS

CN          211697864 U  * 10/2020

OTHER PUBLICATIONS

International Search Report and Written Opinion of the International Searching Authority for International Patent App. No. PCT/US2023/021455 dated as mailed on Aug. 4, 2023 (9 pages).

* cited by examiner

*Primary Examiner* — Eric L Bolda

(57) ABSTRACT

Systems and methods for analyzing laser beam characteristics in high-speed laser motion systems, wherein the characteristics include laser travel speed, velocity, and acceleration, wherein the high-speed laser motion systems comprise a laser for generating a laser beam, comprising determining a location of the first pin-hole sensor within the predetermined field of view; determining a location of the second pin-hole sensor within the predetermined field of view; defining a travel distance of the laser beam; measuring the amount of time to travel from the location of the first pin-hole sensor to the location of the second pin-hole sensor; and dividing the travel distance by the amount of time to travel from the location of the first pin-hole sensor to the location of the second pin-hole sensor to calculate the velocity of the laser beam between the first pin-hole sensor and the second pin-hole sensor.

20 Claims, 13 Drawing Sheets

TRAVEL SPEED MEASUREMENT AND MOTION ANALYSIS OF HIGH-SPEED LASER MOTION SYSTEMS

CROSS-REFERENCE TO RELATED APPLICATIONS

This patent application claims the benefit of U.S. Provisional Patent Application Ser. No. 63/339,824 filed on May 9, 2022, and entitled "Travel Speed Measurement and Motion Analysis of High-Speed Laser Systems", the disclosure of which is hereby incorporated by reference herein in its entirety and made part of the present U.S. utility patent application for all purposes.

BACKGROUND

The disclosed technology relates in general to laser systems having high speed motion capability and more specifically to systems, devices, and methods for characterizing, analyzing, and verifying proper functioning and performance of lasers used in laser processing systems having high speed motion capability.

Laser processing typically includes using a laser beam to modify a work piece in a predetermined manner. Laser processing ranges from high-intensity laser ablation processes to significantly lower intensity processes such as heat treating, in which melting is avoided. Nearly all laser processing techniques involve forming the laser beam into a specific size and shape at a particular location or working distance from the laser system. Precise identification of the location where a laser system will create a focal spot or image having the desired characteristics is an important aspect of creating an efficient and optimized laser process.

Laser processing techniques include laser beam welding (LBW), which is a fusion welding process used to join materials in various configurations. Laser beam welding systems typically include a laser light source, a laser light delivery system, an optical arrangement for delivering laser the light to a work piece, and frequently a motion system for moving either the laser or the work piece. LBW systems may include fiber-delivered beams or open beam paths, fixed optical systems or galvanometer systems that allow for rapid deflection of the laser beam. Mechanical motion systems may include high-speed systems or low-speed systems depending on intended application. For the LBW process, laser light is focused using optical arrangements that include a collimation lens or mirror that stops the divergence of the laser light from the light source and delivers the light to a focusing lens or mirror (or other optic). The focusing lens or mirror then directs the high-intensity, focused laser light to the work piece that is to be welded. The high-intensity laser light is then used to melt the material of the work piece and fuse two or more parts or components together.

The use of laser processing systems, particularly LBW systems, in manufacturing has become common and such systems can be found in many manufacturing facilities worldwide. The functional success of all laser processing systems depends on predetermined, stable, and repeatable laser beam characteristics including focal spot or image shape, distribution, and location. Accordingly, there is an ongoing need for accurate, easy to use, and affordable systems, devices, and methods for analyzing the quality and dynamic accuracy of laser focal spots and images formed by laser processing systems having motion capability.

SUMMARY

The following provides a summary of certain example implementations of the disclosed technology. This summary is not an extensive overview and is not intended to identify key or critical aspects or elements of the disclosed technology or to delineate its scope. However, it is to be understood that the use of indefinite articles in the language used to describe and claim the disclosed technology is not intended in any way to limit the described technology. Rather the use of "a" or "an" should be interpreted to mean "at least one" or "one or more".

One implementation of the disclosed technology provides a method for analyzing laser beam characteristics in high-speed laser motion systems, wherein the characteristics include laser travel speed, velocity, and acceleration, wherein the high-speed laser motion systems comprise a laser for generating a laser beam, comprising positioning a first pin-hole sensor within a predetermined field of view of the laser, and determining a location of the first pin-hole sensor within the predetermined field of view; positioning a second pin-hole sensor within the predetermined field of view, and determining a location of the second pin-hole sensor within the predetermined field of view; using the determined locations of the first pin-hole sensor and the second pin-hole sensor to define a travel distance of the laser beam; measuring the amount of time to travel from the location of the first pin-hole sensor to the location of the second pin-hole sensor; dividing the travel distance by the amount of time to travel from the location of the first pin-hole sensor to the location of the second pin-hole sensor to calculate the velocity of the laser beam between the first pin-hole sensor and the second pin-hole sensor; and dividing the calculated velocity of the laser beam by the amount of time to travel from the location of the first pin-hole sensor to the location of the second pin-hole sensor to calculate the acceleration of the laser beam between the first pin-hole sensor and the second pin-hole sensor.

The method may further comprise positioning a third pin-hole sensor within the predetermined field of view, and determining a location of the third pin-hole sensor within the predetermined field of view; using the determined locations of the first pin-hole sensor and the third pin-hole sensor to define a second travel distance for the laser beam; measuring the amount of time to travel from the location of the first pin-hole sensor to the location of the third pin-hole sensor; dividing the second travel distance by the amount of time to travel from the location of the first pin-hole sensor to the location of the third pin-hole sensor to calculate the velocity of the laser beam between the first pin-hole sensor and the third pin-hole sensor; subtracting the velocity of the laser beam between the first pin-hole sensor and the second pin-hole sensor from the velocity of the laser beam between the first pin-hole sensor and the third pin-hole sensor to calculate a change in velocity of the laser beam; summing the amount of time to travel from the location of the first pin-hole sensor to the location of the second pin-hole sensor plus the amount of time to travel from the location of the first pin-hole sensor to the location of the third pin-hole sensor to calculate a total measured time; and dividing the change in velocity of the laser beam by the total measured time to calculate the acceleration of the laser beam between the first pin-hole sensor and the third pin-hole sensor.

Another implementation of the disclosed technology provides a system for analyzing laser beam characteristics in high-speed laser motion systems, wherein the characteristics include laser travel speed, velocity, and acceleration, wherein the high-speed laser motion systems comprise a laser for generating a laser beam, comprising a first pin-hole sensor positioned within a predetermined field of view of the laser, wherein the first pin-hole sensor has a determined location within the predetermined field of view; and a second pin-hole sensor positioned within the predetermined field of view of the laser, wherein the second pin-hole sensor has a determined location within the predetermined field of view, wherein the determined locations of the first pin-hole sensor and the second pin-hole sensor are used to define a travel distance of the laser beam, wherein the amount of time to travel from the location of the first pin-hole sensor to the location of the second pin-hole sensor is measured, wherein the travel distance is divided by the amount of time to travel from the location of the first pin-hole sensor to the location of the second pin-hole sensor to calculate the velocity of the laser beam between the first pin-hole sensor and the second pin-hole sensor, and wherein the calculated velocity of the laser beam is divided by the amount of time to travel from the location of the first pin-hole sensor to the location of the second pin-hole sensor to calculate the acceleration of the laser beam between the first pin-hole sensor and the second pin-hole sensor.

The first pin-hole sensor and the second pin-hole sensor are mounted in a portable testing apparatus, wherein each pin-hole is positioned to receive the laser light generated by the non-stationary laser beam, and wherein each pin-hole sensor is elevated at a predetermined height above an upper surface of the portable testing apparatus. The system may further comprise a third pin-hole sensor positioned within the predetermined field of view, wherein the third pin-hole sensor has a determined location within the predetermined field of view. The determined locations of the first pin-hole sensor and the third pin-hole sensor are used to define a second travel distance for the laser beam, and wherein the amount of time to travel from the location of the first pin-hole sensor to the location of the third pin-hole sensor is measured. The second travel distance is divided by the amount of time to travel from the location of the first pin-hole sensor to the location of the third pin-hole sensor to calculate the velocity of the laser beam between the first pin-hole sensor and the third pin-hole sensor, and wherein the velocity of the laser beam between the first pin-hole sensor and the second pin-hole sensor is subtracted from the velocity of the laser beam between the first pin-hole sensor and the third pin-hole sensor to calculate a change in velocity of the laser beam. The amount of time to travel from the location of the first pin-hole sensor to the location of the second pin-hole sensor is added with the amount of time to travel from the location of the first pin-hole sensor to the location of the third pin-hole sensor to calculate a total measured time. The change in velocity of the laser beam is divided by the total measured time to calculate the acceleration of the laser beam between the first pin-hole sensor and the third pin-hole sensor.

Still another implementation of the disclosed technology provides a system for analyzing laser beam characteristics in high-speed laser motion systems, wherein the characteristics include laser travel speed, velocity, and acceleration, wherein the high-speed laser motion systems comprise a laser for generating a laser beam, the system comprising positioning a portable testing apparatus within a predetermined field of view of the laser, wherein the portable testing apparatus includes a first pin-hole sensor mounted at a determined location in the portable testing apparatus, wherein the first pin-hole sensor is elevated at a predetermined height above an upper surface of the portable testing apparatus; and a second pin-hole sensor mounted at a determined location in the portable testing apparatus, wherein the second pin-hole sensor is elevated at a predetermined height above the upper surface of the portable testing apparatus; using the determined locations of the first pin-hole sensor and the second pin-hole sensor to define a travel distance of the laser beam; measuring the amount of time to travel from the location of the first pin-hole sensor to the location of the second pin-hole sensor; dividing the travel distance by the amount of time to travel from the location of the first pin-hole sensor to the location of the second pin-hole sensor to calculate the velocity of the laser beam between the first pin-hole sensor and the second pin-hole sensor; and dividing the calculated velocity of the laser beam by the amount of time to travel from the location of the first pin-hole sensor to the location of the second pin-hole sensor to calculate the acceleration of the laser beam between the first pin-hole sensor and the second pin-hole sensor.

The system may further comprise a third pin-hole sensor mounted at a determined location in the portable testing apparatus, wherein the first pin-hole sensor is elevated at a predetermined height above an upper surface of the portable testing apparatus. The determined locations of the first pin-hole sensor and the third pin-hole sensor are used to define a second travel distance for the laser beam, and wherein the amount of time to travel from the location of the first pin-hole sensor to the location of the third pin-hole sensor is measured. The second travel distance is divided by the amount of time to travel from the location of the first pin-hole sensor to the location of the third pin-hole sensor to calculate the velocity of the laser beam between the first pin-hole sensor and the third pin-hole sensor, and wherein the velocity of the laser beam between the first pin-hole sensor and the second pin-hole sensor is subtracted from the velocity of the laser beam between the first pin-hole sensor and the third pin-hole sensor to calculate a change in velocity of the laser beam. The amount of time to travel from the location of the first pin-hole sensor to the location of the second pin-hole sensor is added with the amount of time to travel from the location of the first pin-hole sensor to the location of the third pin-hole sensor to calculate a total measured time. The change in velocity of the laser beam is divided by the total measured time to calculate the acceleration of the laser beam between the first pin-hole sensor and the third pin-hole sensor.

It should be appreciated that all combinations of the foregoing concepts and additional concepts discussed in greater detail below (provided such concepts are not mutually inconsistent) are contemplated as being part of the technology disclosed herein and may be implemented to achieve the benefits as described herein. Additional features and aspects of the disclosed system, devices, and methods will become apparent to those of ordinary skill in the art upon reading and understanding the following detailed description of the example implementations. As will be appreciated by the skilled artisan, further implementations are possible without departing from the scope and spirit of what is disclosed herein. Accordingly, the descriptions provided herein are to be regarded as illustrative and not restrictive in nature.

BRIEF DESCRIPTION OF THE DRAWINGS

The accompanying drawings, which are incorporated into and form a part of the specification, schematically illustrate one or more example implementations of the disclosed technology and, together with the general description given above and detailed description given below, serve to explain the principles of the disclosed subject matter, and wherein.

DETAILED DESCRIPTION

Figure 1:
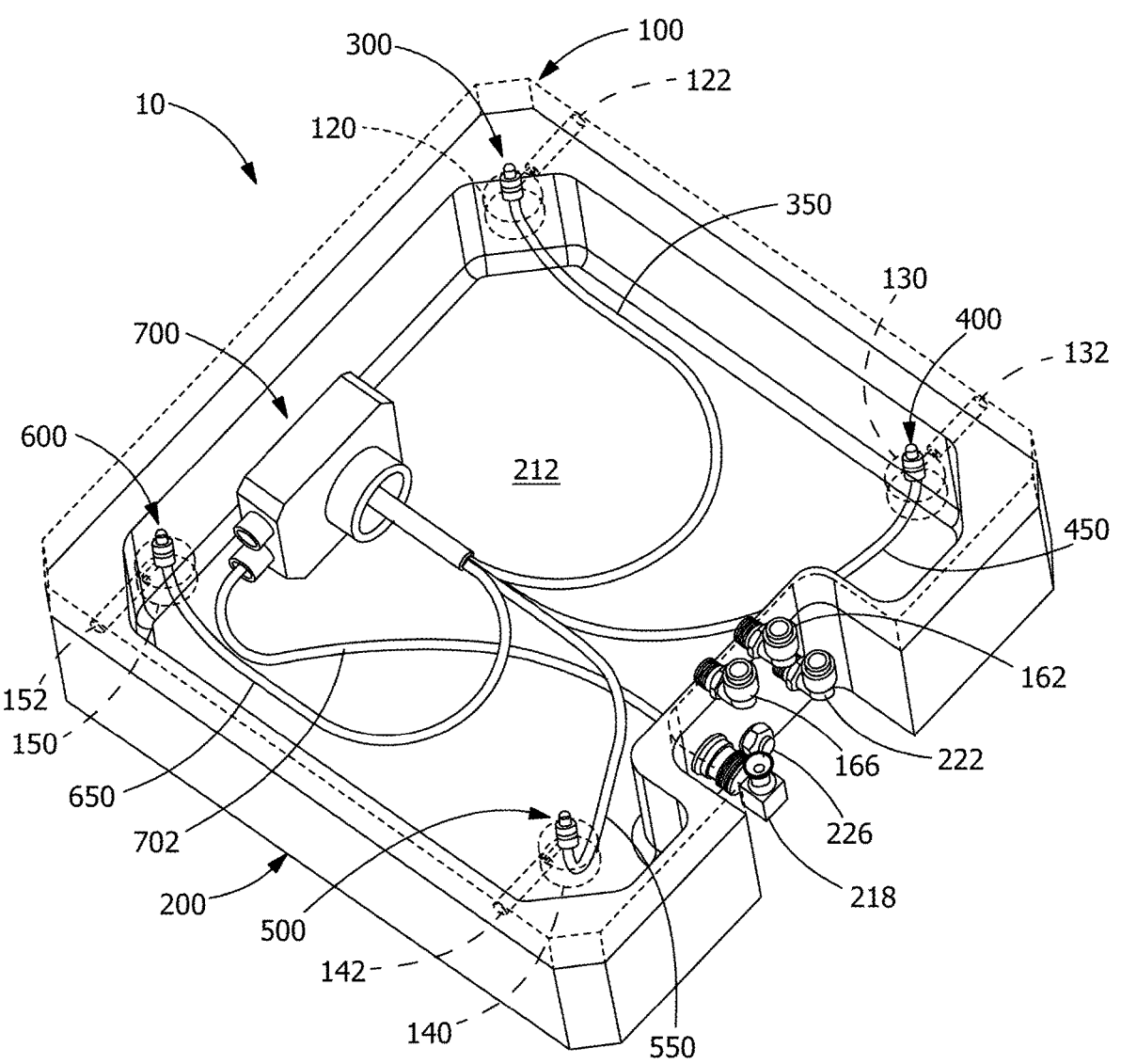
FIG. 1 is a perspective view of an example testing apparatus for use with laser powder bed fusion systems, wherein the calibration plate/support component is shown in broken lines.
Figure 2:
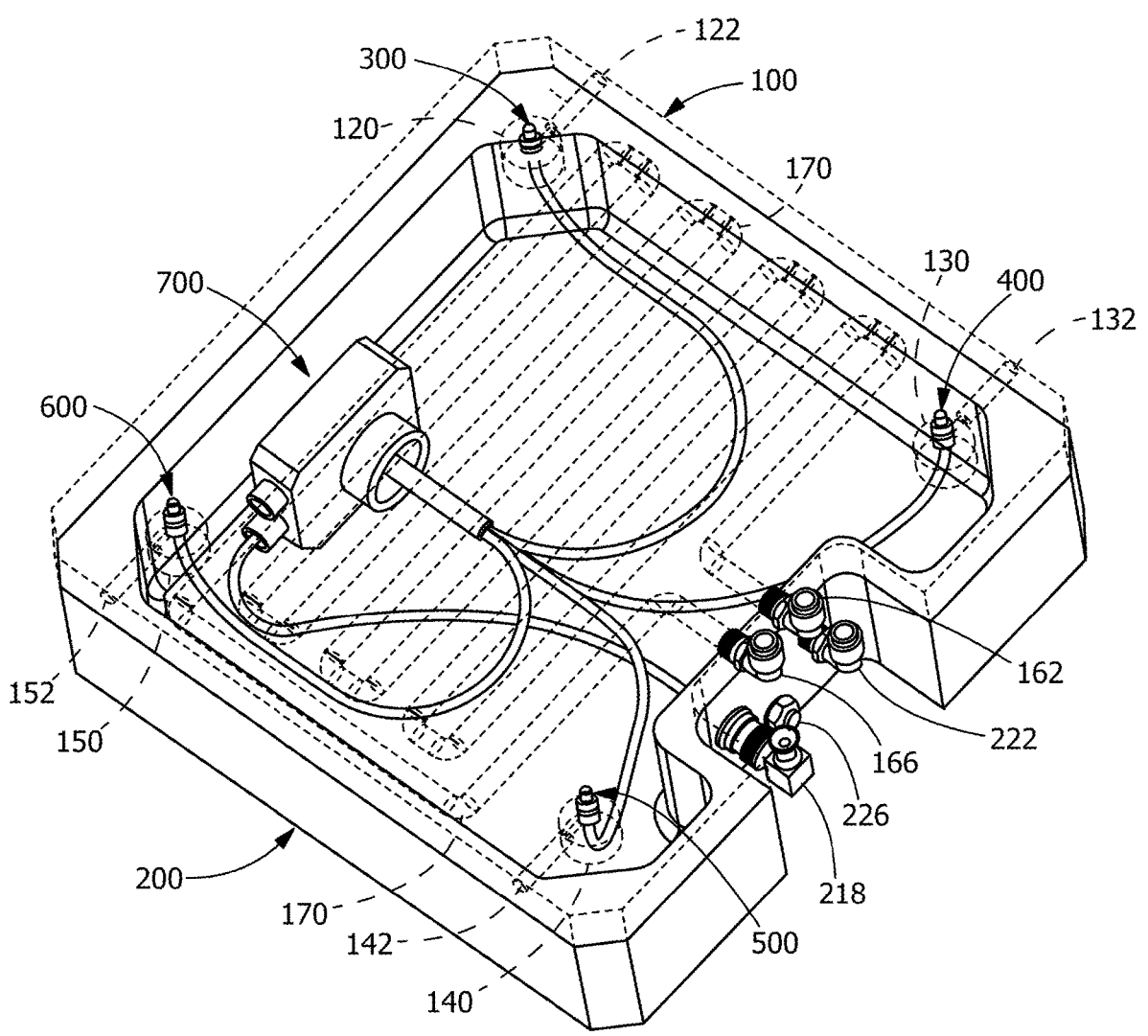
FIG. 2 is a perspective view of the testing apparatus of FIG. 1, wherein the calibration plate/support component and the cooling channels formed therein are shown in broken lines.
Figure 3:
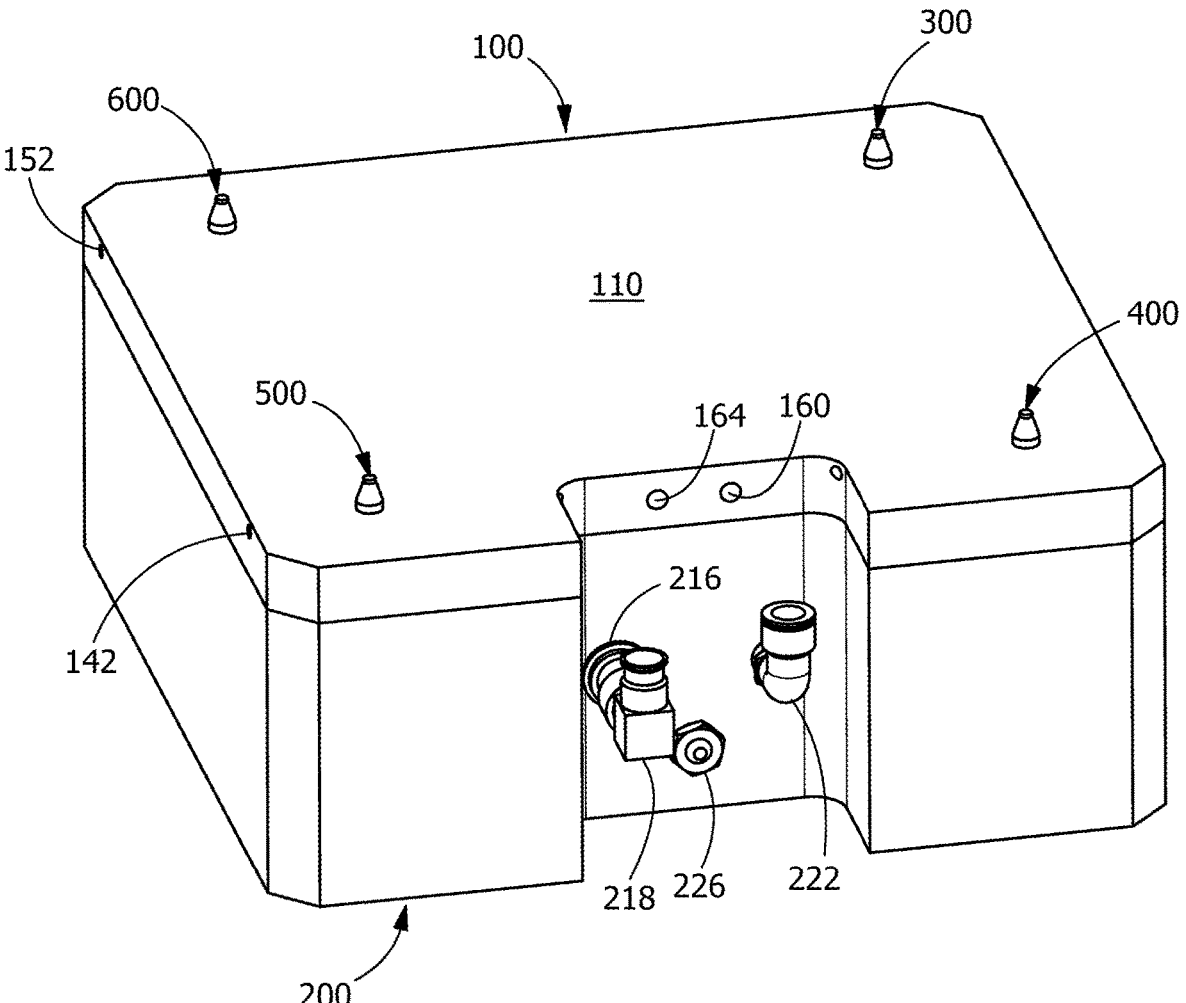
FIG. 3 is a perspective view of the testing apparatus of FIG. 1, wherein the calibration plate/support in which the pin-hole defining structures are mounted is shown in solid lines.
Figure 4:
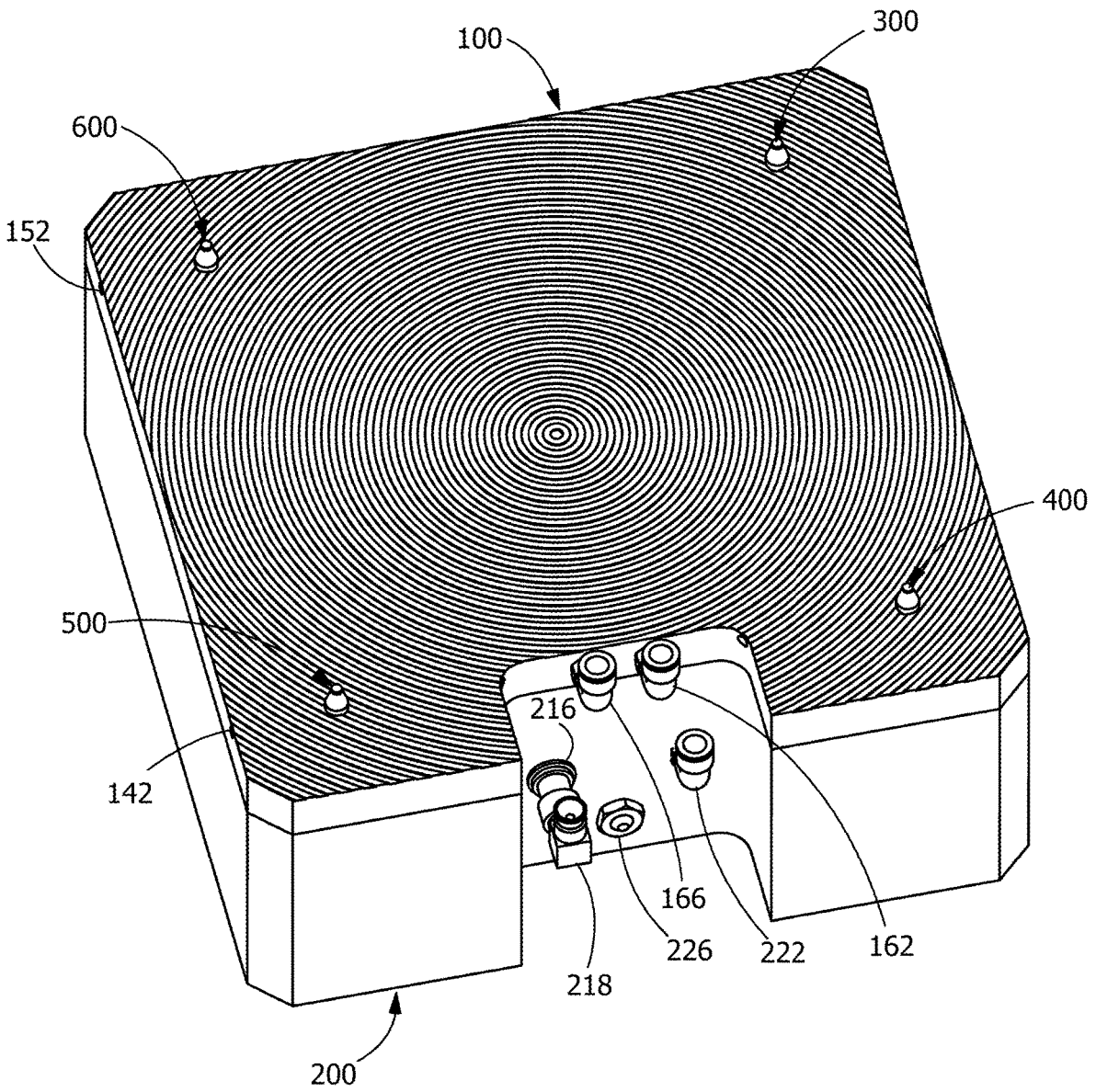
FIG. 4 is a perspective view of the testing apparatus of FIG. 1, wherein the upper surface of the calibration plate/support component includes a plurality of concentrically arranged ridges or raised portions for absorbing and distributing heat generated by a laser beam.
Figures 5A, 5B, 5C:
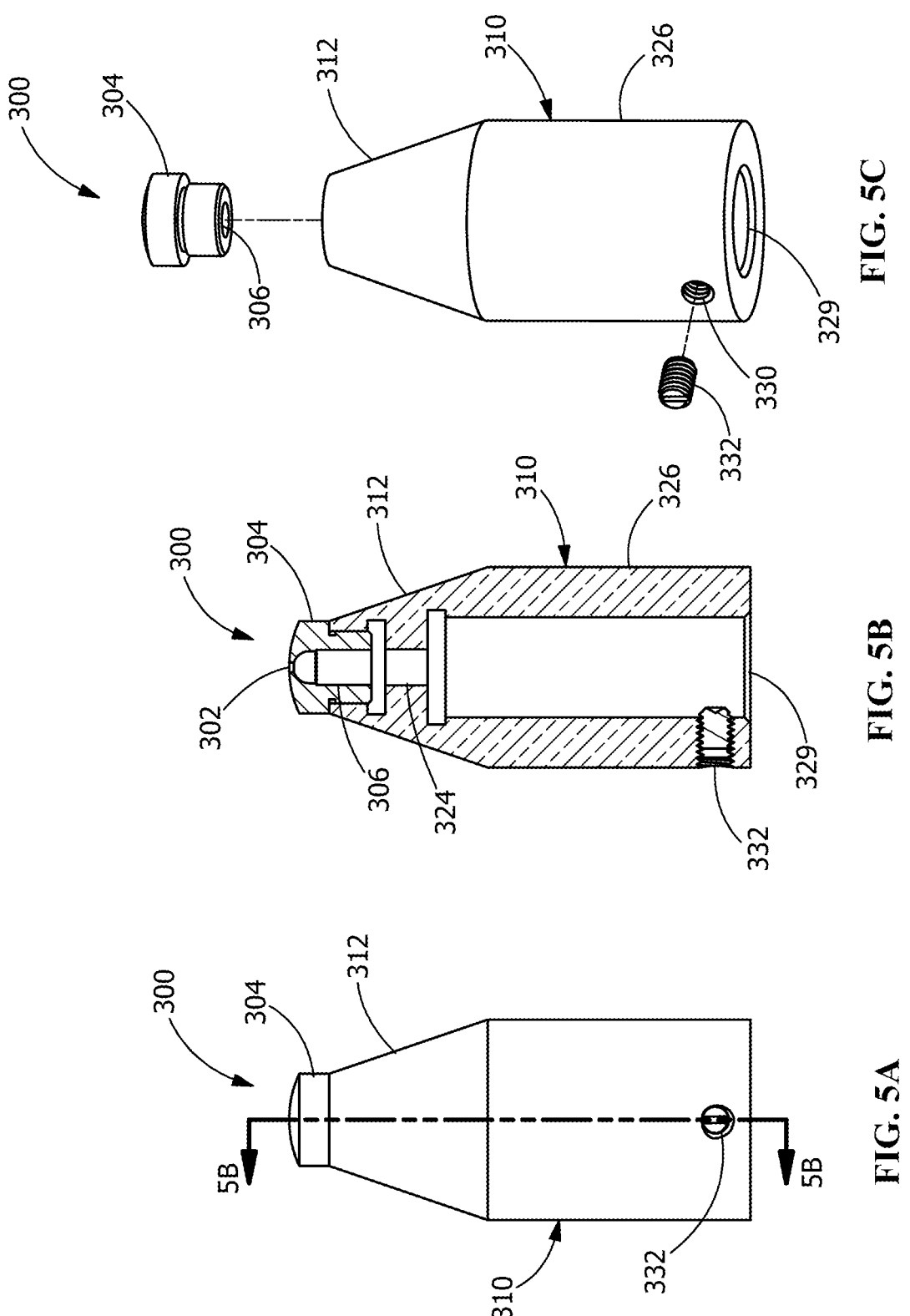
FIG. 5A is a front view of an example pin-hole defining structure (pedestal) shown in an assembled state.
FIG. 5B is a cross-sectional view of the pin-hole defining structure (pedestal) of FIG. 5A.
FIG. 5C is an exploded perspective view of the pin-hole defining structure (pedestal) of FIG. 5A.
Figure 6B:
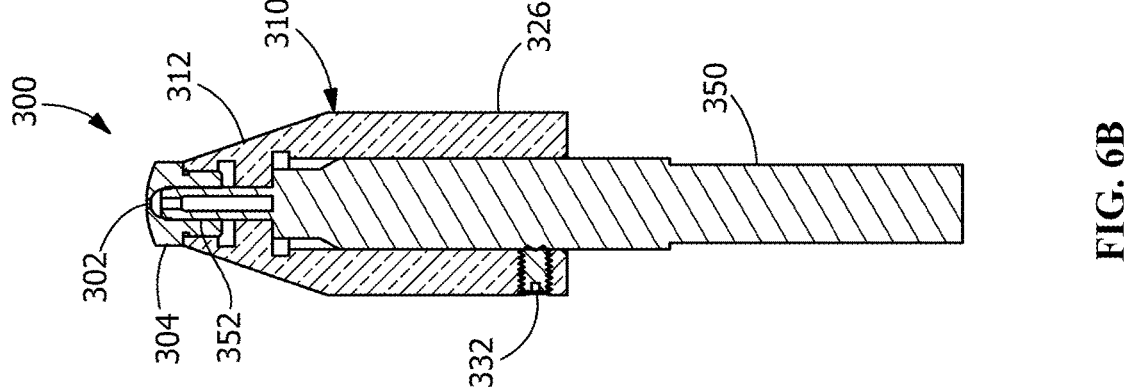
FIG. 6B is a cross-sectional view of the pin-hole defining structure (pedestal) and fiber optic cable assembly shown in FIG. 6A.
Figure 6A:
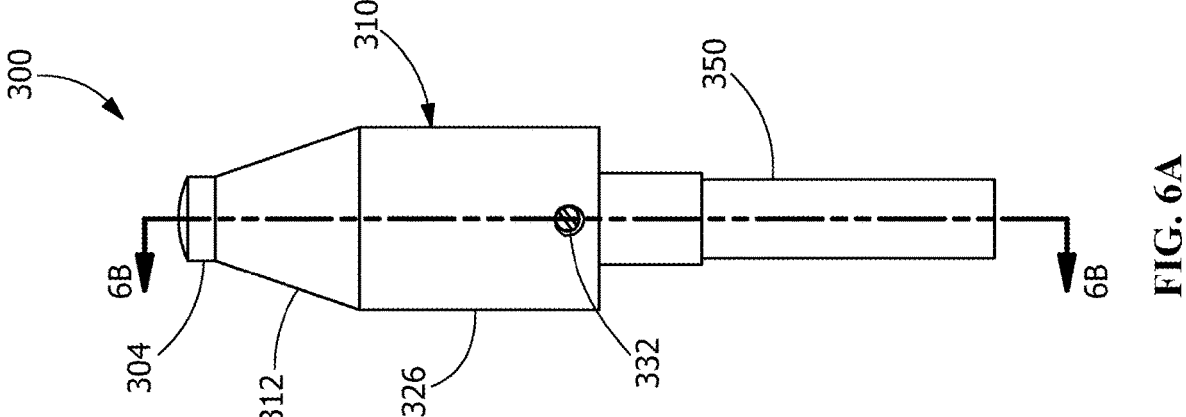
FIG. 6A is a front view of an example pin-hole defining structure (pedestal), wherein a fiber optic cable has been inserted into the pin-hole defining structure (pedestal)
Figures 7A, 7B, 7C:
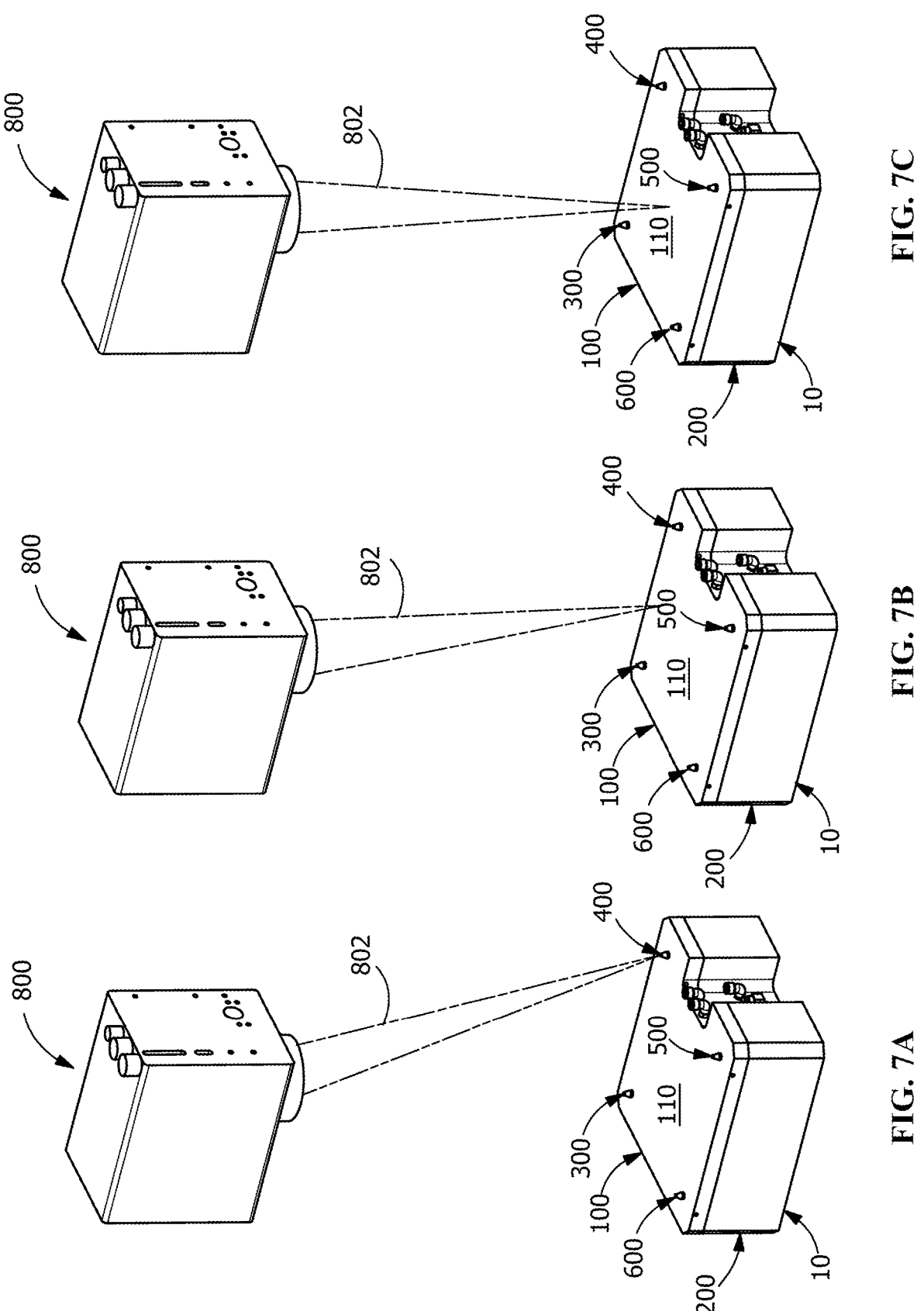
FIG. 7A is an illustration of an example testing apparatus being used to analyze the characteristics of a non-stationary laser beam being generated by a laser source present in a laser powder bed fusion system, wherein the laser beam is shown contacting the testing apparatus at a first position.
FIG. 7B is an illustration of an example testing apparatus being used to analyze the characteristics of a non-stationary laser beam being generated by a laser source present in a laser powder bed fusion system, wherein the laser beam is shown contacting the testing apparatus at a second position.
FIG. 7C is an illustration of an example testing apparatus being used to analyze the characteristics of a non-stationary laser beam being generated by a laser source present in a laser powder bed fusion system, wherein the laser beam is shown contacting the testing apparatus at a third position.
Figures 7D, 7E, 7F:
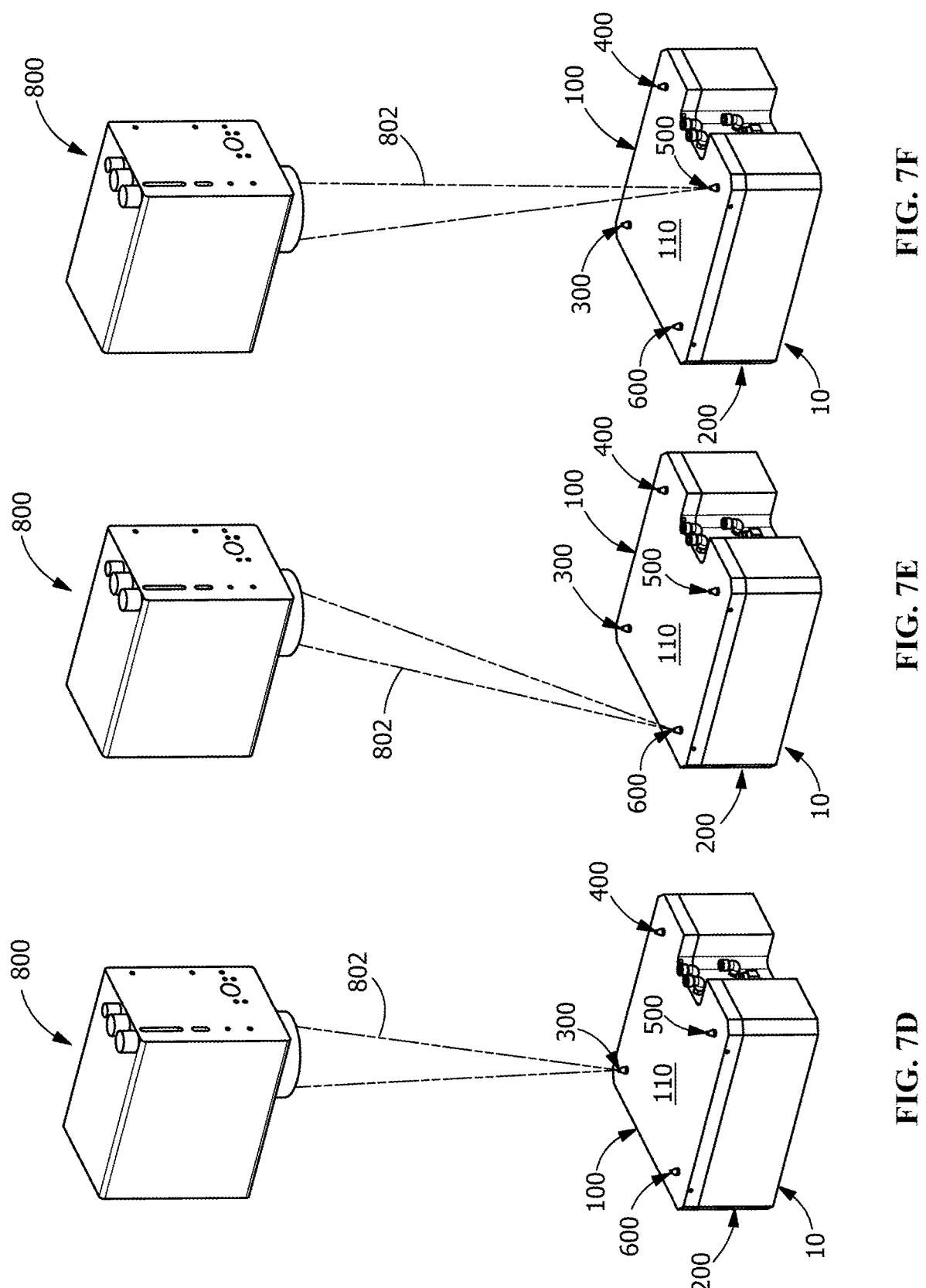
FIG. 7D is an illustration of an example testing apparatus being used to analyze the characteristics of a non-stationary laser beam being generated by a laser source present in a laser powder bed fusion system, wherein the laser beam is shown contacting the testing apparatus at a fourth position.
FIG. 7E is an illustration of an example testing apparatus being used to analyze the characteristics of a non-stationary laser beam being generated by a laser source present in a laser powder bed fusion system, wherein the laser beam is shown contacting the testing apparatus at a fifth position.
FIG. 7F is an illustration of an example testing apparatus being used to analyze the characteristics of a non-stationary laser beam being generated by a laser source present in a laser powder bed fusion system, wherein the laser beam is shown contacting the testing apparatus at a sixth position.

Example implementations are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the disclosed technology. Accordingly, the following implementations are set forth without any loss of generality to, and without imposing limitations upon, the claimed subject matter.

The examples discussed herein are examples only and are provided to assist in the explanation of the apparatuses, devices, systems, and methods described herein. None of the features or components shown in the drawings or discussed below should be taken as required for any specific implementation of any of these the apparatuses, devices, systems or methods unless specifically designated as such. For ease of reading and clarity, certain components, modules, or methods may be described solely in connection with a specific Figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

U.S. Pat. Nos. 10,976,219; and 10,627,311 are relevant to the disclosed technology and the entire contents of each of these patents is expressly incorporated by reference herein and are made part of this patent application for all purposes. These references disclose a system for use in additive manufacturing, for example, which is an industrial process that adds successive superfine layers of material to create three-dimensional objects. Each successive layer bonds or is fused to a preceding layer of melted or partially melted material and different substances for layering material, including metal powder, thermoplastics, ceramics, composites, glass, and other materials. Laser Powder Bed Fusion (L-PBF) is a specific process used in additive manufacturing wherein a three-dimensional component or part is built using a layer-by-layer approach that utilizes a high-power laser. L-PBF typically involves: (i) spreading a layer of powdered material (e.g., metal) over a build platform or plate; (ii) using a laser to fuse the first layer or first cross-section of a part; (iii) spreading a new layer of powder across the previous layer using a roller, recoater arm, coating blade, or similar device; (iv) using the laser to fuse the new layer or new cross-section of the part; (v) adding and fusing successive layers or cross sections; (vi) repeating the process until the entire part is created. Loose, unfused powdered material remains in position, but is removed during post processing.

The functional success of L-PBF systems depends on the existence of a known and stable laser focal spot on the powder bed work plane. The technology disclosed in U.S. Pat. Nos. 10,976,219; and 10,627,311 provides a portable testing apparatus for analyzing the quality and dynamic accuracy of laser focal spots in various L-PBF systems and devices. This testing apparatus is used with a laser powder bed fusion additive manufacturing device that further includes at least one laser that generates a non-stationary laser beam having known or predetermined characteristics and a build plane positioned at a predetermined location relative to the non-stationary laser beam, wherein the non-stationary laser beam translates (i.e., traverses) across the build plane in a controlled manner during additive manufacturing processes. The apparatus includes a support having an upper surface adapted to receive and absorb laser light generated by the non-stationary laser beam; a plurality of pin-hole defining structures each positioned to receive the laser light generated by the non-stationary laser beam, and such that each pin-hole is elevated at a predetermined height above the upper surface of the support and parallel thereto; a fiber optic cable disposed within each pin-hole defining structure, wherein each fiber optic cable has a proximal end at which the laser light is received through the pin-hole and a distal end to which the laser light is delivered; and a photodetector located at the distal end of each fiber optic cable, wherein the photodetector converts the laser light delivered to the photodetector into electrical voltage output signals based on intensity of the laser light received through each pin-hole. FIGS. 1-4, 5A-C, 6A-6B, 7A-F, and 8A-C provide various illustrative views of an example testing apparatus for analyzing the quality and dynamic accuracy of laser focal spots in various laser-based manufacturing systems including L-PBF systems and laser beam welding (LBW) systems.

As best shown in FIGS. 1-4, example testing apparatus 10 includes support 100; base 200; pin-hole defining structures or pin-hole sensors 300, 400, 500, and 600, which are mounted in support 100; and photodetector 700, which is located in base 200. Support 100, which is roughly square in shape, and which may be referred to as a calibration plate, includes an absorptive upper surface 110, which may further include a series of concentrically arranged ridges or other raised structures (see FIG. 4) that absorb and distribute heat generated by the laser beam for preventing damage to upper surface 110 and support 100. Support 100 further includes first mounting recess 120 (for receiving first pin-hole defining structure 300), first set screw aperture 122 (for receiving a set screw that secures first pin-hole defining structure 300 within first mounting recess 120), second mounting recess 130 (for receiving second pin-hole defining structure 400), second set screw aperture 132 (for receiving a set screw that secures second pin-hole defining structure 400 within second mounting recess 130), third mounting recess 140 (for receiving third pin-hole defining structure 500), third set screw aperture 142 (for receiving a set screw that secures third pin-hole defining structure 500 within third mounting recess 140, fourth mounting recess 150 (for receiving fourth pin-hole defining structure 600), and fourth set screw aperture 152 (for receiving a set screw that secures fourth pin-hole defining structure 600 within fourth mounting recess 150). Support 100 also includes first aperture 160 for receiving first coolant fitting 162, second aperture 164 for receiving second coolant fitting 166 and channels 170 for receiving and transporting liquid or gas coolant that transfers energy absorbed by support 100 away from testing apparatus 10.

Also, as best shown in FIGS. 1-4, base 200, the shape of which corresponds to the shape of support 100, cooperates with support 100 to form an enclosure. Base 200 includes outer wall 210 and inner cavity 212 in which photodetector 700 and the various fiber optic cables attached to the pin-hole defining structures are placed. Base 200 also includes aperture 214 for receiving Bayonet Neill-Concelman (BNC) bulkhead 216 to which BNC connector 218 is attached, second aperture 220 for receiving gas fitting 222, and third aperture 224 for receiving gas relief valve 226. In certain embodiments, a source of pressurized gas is connected to gas fitting 222 for delivering outwardly flowing gas to and through each pin-hole for preventing the contamination thereof by debris generated during the testing process or other debris.

With reference to FIGS. 1-4, 5A-C, and 6A-6B, the example embodiment of testing apparatus 10 shown in the Figures includes four pin-hole defining structures, which are also referred to as "pedestals". FIGS. 5A-C and 6A-6B illustrate only first pin-hole defining structure 300; however, the remaining pin-hole defining structures (400, 500, and 600) are constructed in the same manner as first pin-hole defining structure 300. Accordingly, FIGS. 5A-C and 6A-6B are meant to be representative of all of the pin-hole defining structures depicted in the Figures.

As shown in FIGS. 5A-C and 6A-6B, first pin-hole defining structure or pedestal 300 includes first pin-hole 302, which is formed in tip 304 through which channel 306 passes. The diameter of pin-hole 302 is typically one third to one-thirtieth the diameter of the laser beam being characterized by testing apparatus 10 (e.g., pinhole diameter: 5-50 µm). Tip 304 typically includes a highly reflective material such as gold, copper, or other reflective metal for minimizing damage to the pin-hole and pin-hole defining structure caused by absorption of energy from the laser beam. Tip 304 is mounted within body 310 which includes tapered portion 312 and cylindrical portion 326 through which channel 328 passes. First set screw aperture 330 is adapted to receive first set screw 332 which secures first fiber optic cable 350 in body 310. First optical fiber 352 is inserted into channel 306 and brought into close proximity with first pin-hole 302. First pin-hole defining structure or pedestal 300 is mounted within support 100 such that the pin-hole is elevated above upper surface 110 at a height (e.g. 20 to 40 mm) that minimizes any damage to the pin-hole and pedestal that may be caused by the energy of the non-stationary laser beam.

FIGS. 7A-7F are illustrations of testing apparatus 10 being used to analyze the characteristics of a non-stationary laser beam generated by a laser source present in a laser powder bed fusion system being used for additive manufacturing. In these Figures, laser source or laser 800 generates laser beam 802, which contacts upper surface 110 of testing apparatus 10 at multiple positions or locations, including locations that include the previous discussed pin-holes. During the normal operation of testing apparatus 10, laser beam 802 is continually manipulated at typical operating power for bringing all the laser beam delivery elements of the laser powder bed fusion machine or system up to normal operating temperature and functionality such that any misalignment of laser beam 802 or loss of laser focus quality may be detected.

Figure 8A:
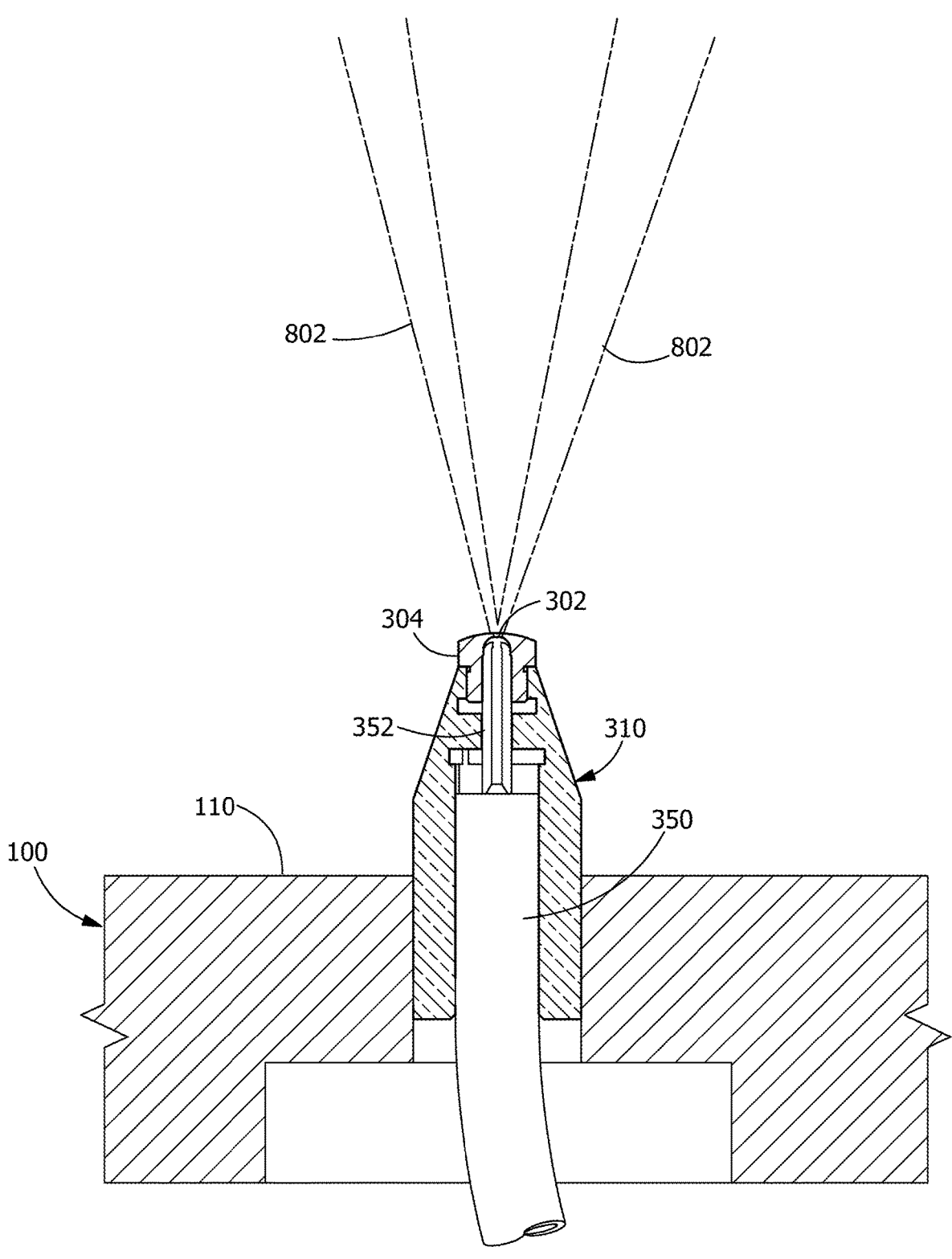
FIG. 8A is a cross-sectional view of an example pin-hole defining structure shown mounted in the calibration plate/support and receiving laser light from a laser beam being analyzed by the testing apparatus.
Figure 8B:
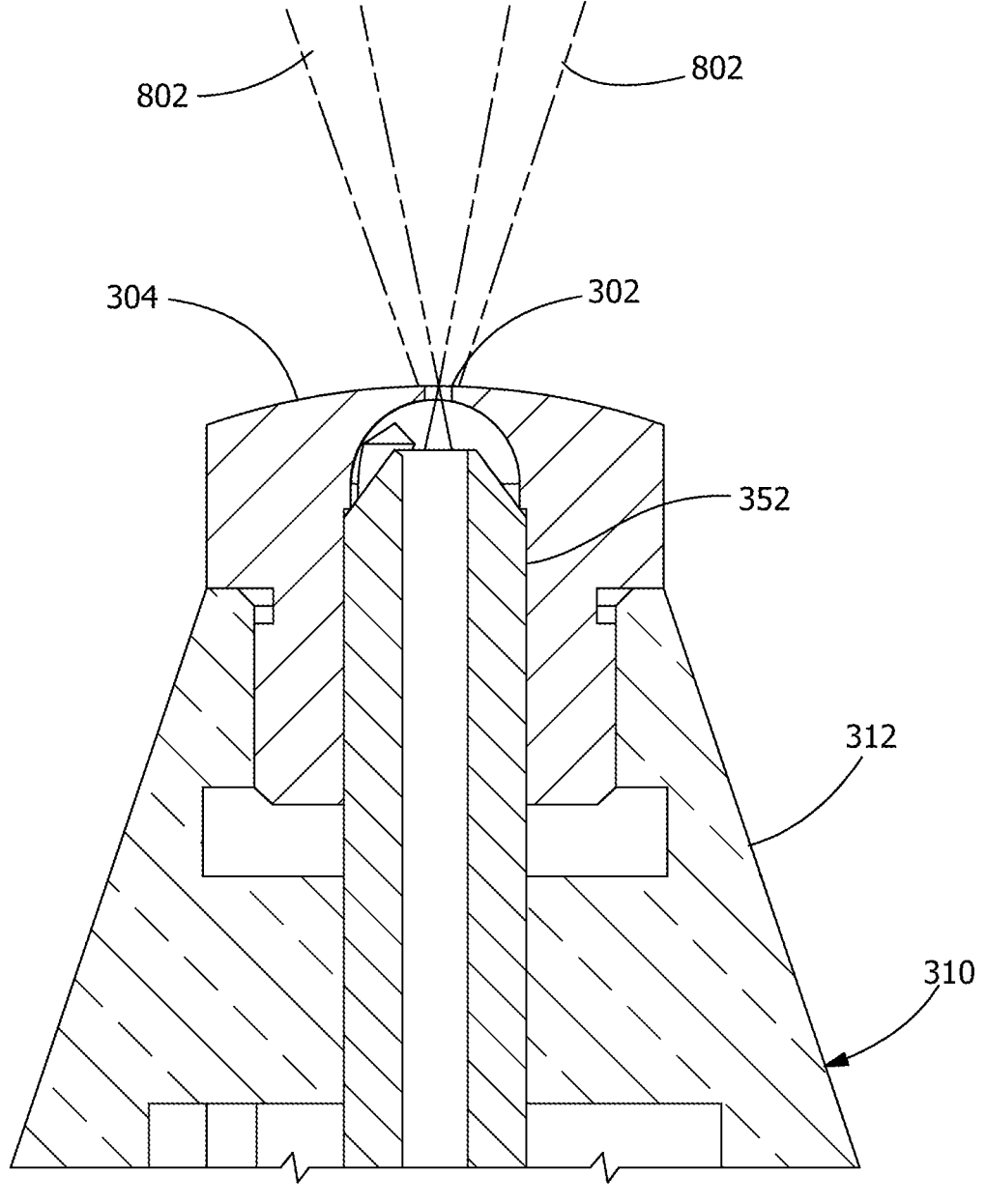
FIG. 8B is a detail of the upper portion of FIG. 8A showing a portion of the laser light passing through a pin-hole and the remaining laser light being reflected by the pin-hole defining structure.
Figure 8C:
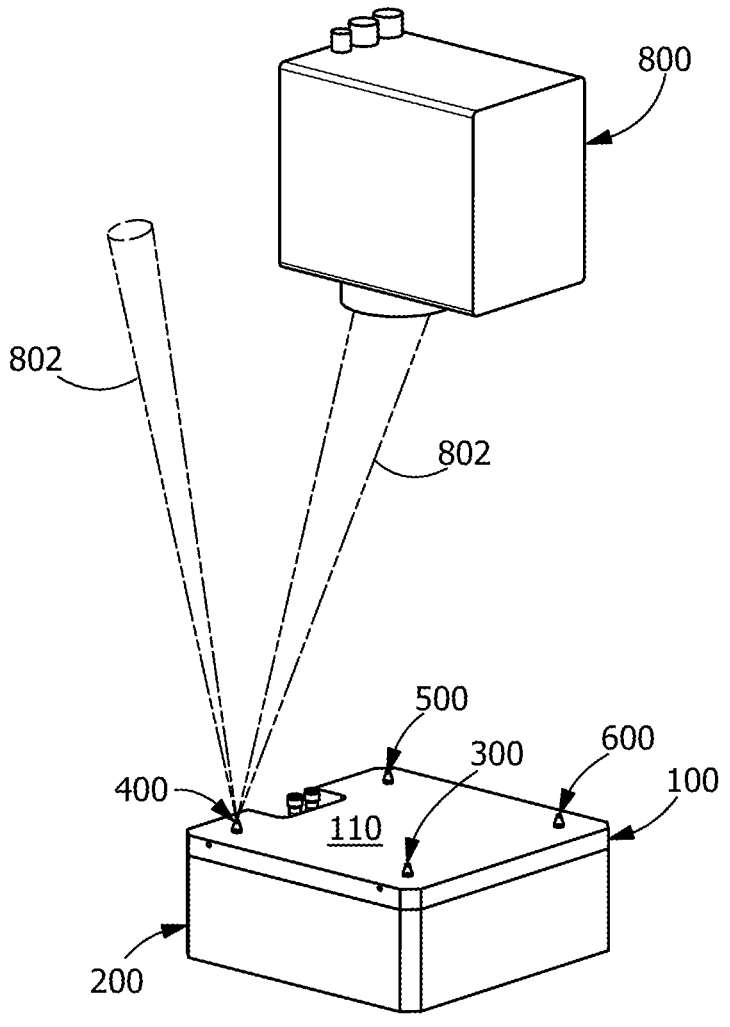
FIG. 8C is an illustration of an example testing apparatus being used to analyze the characteristics of a non-stationary laser beam being generated by a laser source present in a laser powder bed fusion system, wherein the laser beam is shown reflecting from one of the pin-hole defining structures.

FIG. 8A provides a cross-sectional view of pin-hole defining structure 300 shown mounted in support 100 and receiving laser light from laser beam 802 during normal operation of a laser powder bed fusion system being analyzed. FIG. 8B is a detail of the upper portion of FIG. 8A showing the laser light being reflected by pin-hole defining structure 300; and FIG. 8C provides an illustration of testing apparatus 10 being used to analyze the characteristics of non-stationary laser beam 802 being generated by laser source 800, wherein laser beam 802 is shown reflecting from pin-hole defining structure 400. In FIGS. 8A-8B, light from laser beam 802 is shown passing through pin-hole 302 and entering optical fiber 352 through which the signal is transmitted to photodetector 700 (see FIG. 1). The laser light than passes through pin-hole 302 is only a small amount of the laser light generated by laser beam 802. For example, for a laser beam having a total diameter of about 0.1 mm, the diameter of the portion of the beam that passes though pin-hole 302 would be about 0.025 mm. Laser light collected from each pin-hole may be transmitted to one or more light measuring devices through fiber optic coupling. Testing apparatus 10 includes a data acquisition device in communication with photodetector 700, wherein the data acquisition device receives, saves, organizes, and analyzes electrical signals as a function of time, or time and position, relative to the pin-holes through which the laser light was received. A data analysis algorithm associated with the data acquisition device calculates and determines laser beam quality based on data acquired from multiple passes of the non-stationary laser beam over the plurality of pin-holes. The data acquisition device may also include hardware and/or software (e.g., blue tooth or the like) that enables the transmission of data to a receiver located outside of an additive manufacturing device.

The systems, devices, and methods described above, and in U.S. Patent Publication No. 2021/0223140, which is also incorporated by reference herein in its entirety, are useful for analyzing many aspects of high-speed laser motion systems. In one implementation, the disclosed technology is used in a method for using a minimum of two measurement devices (i.e., two pinhole sensors) for analyzing the amount of time required for a high-speed motion device to move a laser beam over two or more locations. Additional measurement devices can be added to increase accuracy and to evaluate acceleration or other motion-related parameters. Adding additional arrays of measurement devices also reduces required alignment accuracy if the devices are strategically located.

Figure 9:
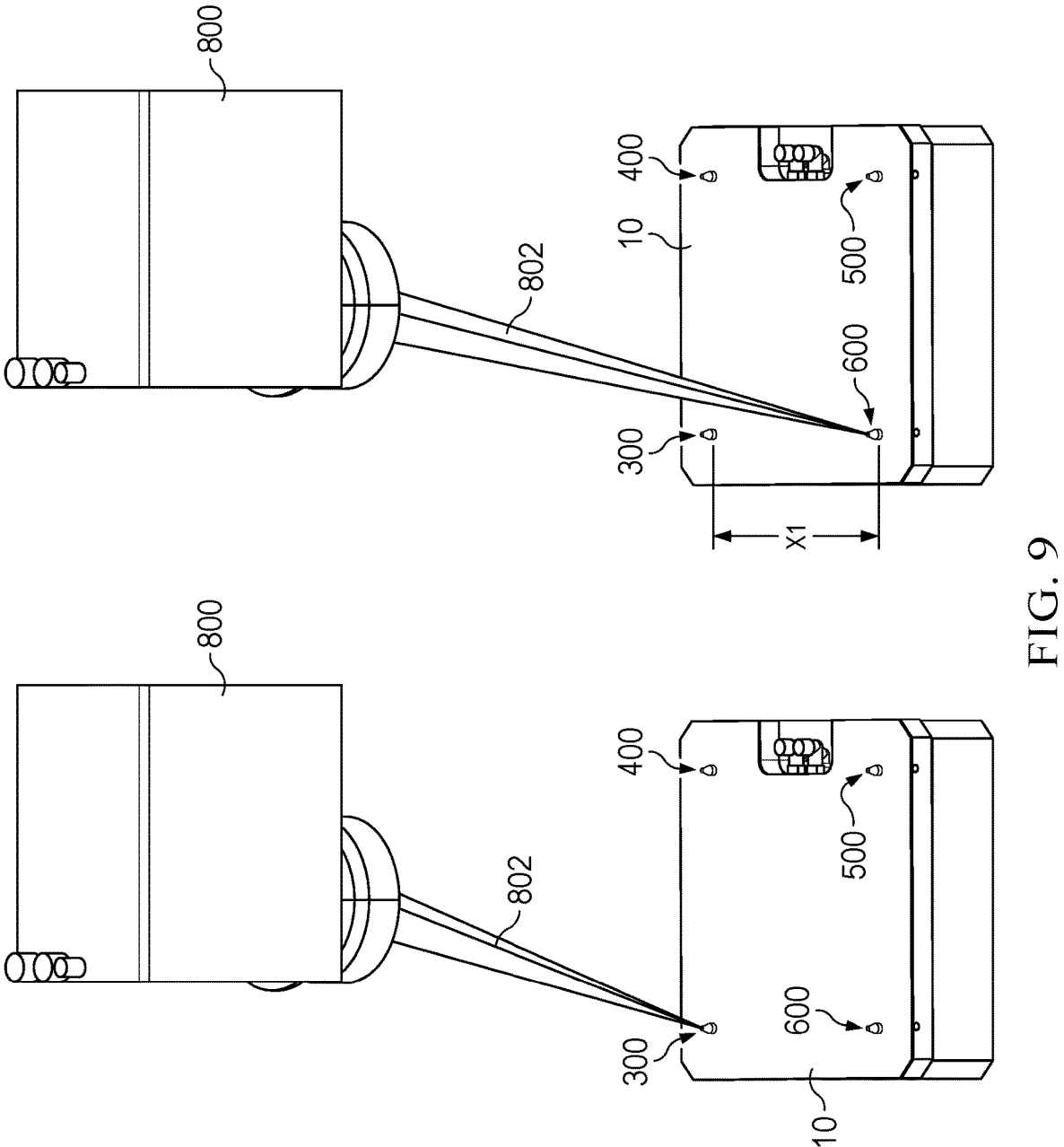
FIG. 9 depicts an example implementation of the disclosed system, wherein the system is configured for measuring velocity and travel speed of a laser beam.

FIG. 9 depicts an example implementation of the disclosed technology wherein the system is configured for velocity and travel speed measurement. To accurately analyze the travel speed of a laser beam, two measurement devices are precisely located within the field of view of the high-speed motion system (e.g., laser scanner). To determine the measurement device location, the system rasters over an area of the field of view and software analyzes signals received relative to system location and reports that information as the starting measurement location. The system again rasters over a second location and so on for each additional measurement location. Each of these reported locations is then used along a travel path during a speed test. Once locations are identified, the system moves the beam over those locations and measures the amount of time required to move from one location to another location. The Distance X1 shown in FIG. 9 is a known precision measurement and the Measured Time shown in Equation 1 below is the time recorded during a test. The calculation shown in Equation 1 is completed to analyze the velocity or travel speed of the system. The calculated travel speed is then be compared to a commanded speed.

$$\text{Velocity} = \frac{\text{Distance}}{\text{Time}} = \frac{\text{Distance } X1}{\text{Measured Time}} \qquad \text{Equation 1}$$

Figure 10:
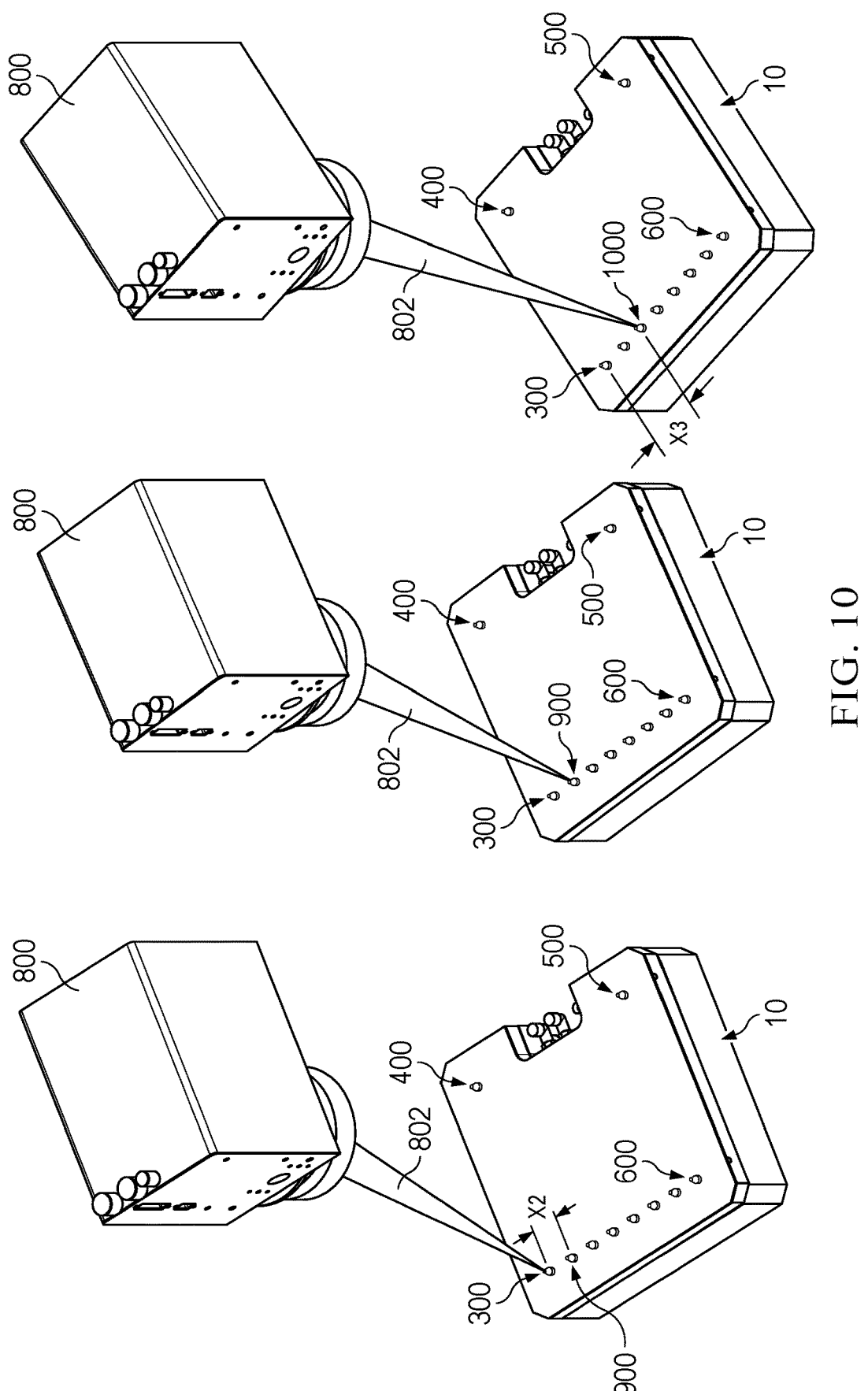
FIG. 10 depicts an example implementation of the disclosed system, wherein the system is configured for measuring acceleration of the laser beam.

FIG. 10 depicts an example implementation of the disclosed technology wherein the system is configured for acceleration measurements. As shown in FIG. 10, additional or different measurements can be taken using additional measurement devices, including acceleration and travel speed changes as the motion system changes direction, and for critical geometries, and location repeatability. Calculations similar to those described above can then be used to analyze these characteristics. Changes in time between known locations allow for these measurements and calculations, as shown in Equation 2.

$$\text{Equation 2}$$

$$\text{Acceleration} =$$

$$\frac{\Delta \text{Velocity}}{\Delta \text{Time}} = \frac{\dfrac{\text{Distance } X3}{\text{Measured Time } X3} - \dfrac{\text{Distance } X2}{\text{Measured Time } X2}}{\text{Total Measured Time}}$$

Advantages of the disclosed technology include the following. With a minimum of 2 measurement locations (e.g., pinholes) velocity (i.e., travel speed) can be analyzed. Additional measurement locations allow for analysis of system acceleration and other motion characteristics. Software and beam motion can be used to find measurement locations. Prior art systems including Primes Scan Field Monitor and Ophir Beam Watch AM are limited in sampling capability and location (or are incapable thereof). These systems have limited or no capability to sample the beam in motion, as it would be used in-process, and these systems have no current capability to sample the beam during a build. Numerous business entities are original equipment manufacturers, users, customizers, and analyzers of laser processing systems, including laser powder bed fusion systems and remote laser welding systems. Commercially available analytical systems are not sufficient for analyzing laser processing systems due to design limitations that require stationary beams and because large analytical systems limit the field of view areas that can be analyzed. Additionally, industry standards such as AMS 7003 create demand for a system such as the disclosed technology, which does not suffer from the design limitations of existing systems. The disclosed technology is particularly useful for assuring that a given high-speed laser motion system is operating within accepted quality standards.

FIG. 9 is an example implementation of testing apparatus 10 being used to analyze travel speed, velocity, and acceleration of non-stationary laser beam 802 generated from laser 800 in high-speed laser motion systems. As shown in FIG. 9, testing apparatus 10 includes pin-hole sensors 300, 400, 500, 600 at predetermined locations. In this example embodiment, laser 800 generates non-stationary laser beam 802, which is first directed to pin-hole sensor 300. Non-stationary laser beam 802 is then directed to pin-hole sensor 600. The predetermined locations of pin-hole sensor 300 and pin-hole sensor 600 are used to define distance X1, which is the travel distance of non-stationary laser beam 802. The time for non-stationary laser beam 802 to travel Distance X1 is measured. Equation 1, as defined above, can then be used to calculate the travel speed or velocity of non-stationary laser beam 802 between pin-hole sensors 300, 600. Further, Equation 2, as defined above, can be used to calculate the acceleration of non-stationary laser beam 802 between pin-hole sensors 300, 600. It will be appreciated that travel speed, velocity, and acceleration of non-stationary laser beam 802 can be determined between any of pin-hole sensors 300, 400, 500, 600.

FIG. 10 is another example implementation of testing apparatus 10 being used to analyze travel speed, velocity, and acceleration of non-stationary laser beam 802 generated from laser 800 in high-speed laser motion systems. As shown in FIG. 10, testing apparatus 10 includes pin-hole sensors 300, 400, 500, 600 at predetermined locations with additional pin-hole sensors 900, 1000 positioned between pin-hole sensors 300, 600. In this example embodiment, laser 800 generates non-stationary laser beam 802, which is first directed to pin-hole sensor 300. Non-stationary laser beam 802 is then directed to pin-hole sensor 900 and then to pin-hole sensor 1000. The predetermined locations pin-hole sensors 300, 900 are used to define distance X2, which is the travel distance of non-stationary laser beam 802 between pin-hole sensors 300, 900. The predetermined locations pin-hole sensors 300, 1000 are used to define distance X3, which is the travel distance of non-stationary laser beam 802 between pin-hole sensors 300, 1000. The times for non-stationary laser beam 802 to travel distance X2 and X3 are then measured. Equation 1, as defined above, can then be used to calculate the travel speed or velocity of non-stationary laser beam 802 between pin-hole sensors 300, 1000. Further, Equation 2, as defined above, can be used to calculate the acceleration of non-stationary laser beam 802 between pin-hole sensors 300, 1000. Additional pin-hole sensors that function the same as pin-hole sensors 300, 400, 500, 600, 900, 1000 can be positioned in testing apparatus 10 at various predetermined locations, such that travel speed, velocity, and acceleration of non-stationary laser beam 802 can be determined between any of the additional pin-hole sensors.

All literature and similar material cited in this application, including, but not limited to, patents, patent applications, articles, books, treatises, and web pages, regardless of the format of such literature and similar materials, are expressly incorporated by reference in their entirety. Should one or more of the incorporated references and similar materials differs from or contradicts this application, including but not limited to defined terms, term usage, described techniques, or the like, this application controls.

As previously stated and as used herein, the singular forms "a," "an," and "the," refer to both the singular as well as plural, unless the context clearly indicates otherwise. The term "comprising" as used herein is synonymous with "including," "containing," or "characterized by," and is inclusive or open-ended and does not exclude additional, unrecited elements or method steps. Although many methods and materials similar or equivalent to those described herein can be used, particular suitable methods and materials are described herein. Unless context indicates otherwise, the recitations of numerical ranges by endpoints include all numbers subsumed within that range. Furthermore, references to "one implementation" are not intended to be interpreted as excluding the existence of additional implementations that also incorporate the recited features. Moreover, unless explicitly stated to the contrary, implementations "comprising" or "having" an element or a plurality of elements having a particular property may include additional elements whether or not they have that property.

The terms "substantially" and "about", if or when used throughout this specification describe and account for small fluctuations, such as due to variations in processing. For example, these terms can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%, and/or 0%.

Underlined and/or italicized headings and subheadings are used for convenience only, do not limit the disclosed subject matter, and are not referred to in connection with the interpretation of the description of the disclosed subject matter. All structural and functional equivalents to the elements of the various implementations described throughout this disclosure that are known or later come to be known to those of ordinary skill in the art are expressly incorporated herein by reference and intended to be encompassed by the disclosed subject matter. Moreover, nothing disclosed herein is intended to be dedicated to the public regardless of whether such disclosure is explicitly recited in the above description.

There may be many alternate ways to implement the disclosed technology. Various functions and elements described herein may be partitioned differently from those shown without departing from the scope of the disclosed technology. Generic principles defined herein may be applied to other implementations. Different numbers of a given module or unit may be employed, a different type or types of a given module or unit may be employed, a given module or unit may be added, or a given module or unit may be omitted.

Regarding this disclosure, the term "a plurality of" refers to two or more than two. Unless otherwise clearly defined, orientation or positional relations indicated by terms such as "upper" and "lower" are based on the orientation or positional relations as shown in the figures, only for facilitating description of the disclosed technology and simplifying the description, rather than indicating or implying that the referred devices or elements must be in a particular orientation or constructed or operated in the particular orientation, and therefore they should not be construed as limiting the disclosed technology. The terms "connected", "mounted", "fixed", etc. should be understood in a broad sense. For example, "connected" may be a fixed connection, a detachable connection, or an integral connection; a direct connection, or an indirect connection through an intermediate medium. For an ordinary skilled in the art, the specific meaning of the above terms in the disclosed technology may be understood according to specific circumstances.

Specific details are given in the above description to provide a thorough understanding of the disclosed technology. However, it is understood that the disclosed embodiments and implementations can be practiced without these specific details. For example, circuits can be shown in block diagrams in order not to obscure the disclosed implementations in unnecessary detail. In other instances, well-known circuits, processes, algorithms, structures, and techniques can be shown without unnecessary detail in order to avoid obscuring the disclosed implementations.

Implementation of the techniques, blocks, steps and means described above can be accomplished in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

The disclosed technology can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, the disclosed technology can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

It should be appreciated that all combinations of the foregoing concepts and additional concepts discussed in greater detail herein (provided such concepts are not mutually inconsistent) are contemplated as being part of the disclosed technology. In particular, all combinations of claimed subject matter appearing at the end of this disclosure are contemplated as being part of the technology disclosed herein. While the disclosed technology has been illustrated by the description of example implementations, and while the example implementations have been described in certain detail, there is no intention to restrict or in any way limit the scope of the appended claims to such detail. Additional advantages and modifications will readily appear to those skilled in the art. Therefore, the disclosed technology in its broader aspects is not limited to any of the specific details, representative devices and methods, and/or illustrative examples shown and described. Accordingly, departures may be made from such details without departing from the spirit or scope of the general inventive concept.

What is claimed:

1. A method for analyzing laser beam characteristics in high-speed laser motion systems, wherein the characteristics include laser travel speed, velocity, and acceleration, wherein the high-speed laser motion systems comprise a laser for generating a laser beam, comprising:

(a) positioning a first pin-hole sensor within a predetermined field of view of the laser, and determining a location of the first pin-hole sensor within the predetermined field of view;

(b) positioning a second pin-hole sensor within the predetermined field of view, and determining a location of the second pin-hole sensor within the predetermined field of view;

(c) using the determined locations of the first pin-hole sensor and the second pin-hole sensor to define a travel distance of the laser beam;

(d) measuring the amount of time to travel from the location of the first pin-hole sensor to the location of the second pin-hole sensor;

(e) dividing the travel distance by the amount of time to travel from the location of the first pin-hole sensor to the location of the second pin-hole sensor to calculate the velocity of the laser beam between the first pin-hole sensor and the second pin-hole sensor; and (f) dividing the calculated velocity of the laser beam by the amount of time to travel from the location of the first pin-hole sensor to the location of the second pin-hole sensor to calculate the acceleration of the laser beam between the first pin-hole sensor and the second pin-hole sensor.

2. The method of claim 1, further comprising positioning a third pin-hole sensor within the predetermined field of view and determining a location of the third pin-hole sensor within the predetermined field of view.

3. The method of claim 2, further comprising using the determined locations of the first pin-hole sensor and the third pin-hole sensor to define a second travel distance for the laser beam.

4. The method of claim 3, further comprising measuring the amount of time to travel from the location of the first pin-hole sensor to the location of the third pin-hole sensor.

5. The method of claim 4, further comprising:

(a) dividing the second travel distance by the amount of time to travel from the location of the first pin-hole sensor to the location of the third pin-hole sensor to calculate the velocity of the laser beam between the first pin-hole sensor and the third pin-hole sensor, and (b) subtracting the velocity of the laser beam between the first pin-hole sensor and the second pin-hole sensor from the velocity of the laser beam between the first pin-hole sensor and the third pin-hole sensor to calculate a change in velocity of the laser beam.

6. The method of claim 5, further comprising summing the amount of time to travel from the location of the first pin-hole sensor to the location of the second pin-hole sensor plus the amount of time to travel from the location of the first pin-hole sensor to the location of the third pin-hole sensor to calculate a total measured time.

7. The method of claim 6, further comprising dividing the change in velocity of the laser beam by the total measured time to calculate the acceleration of the laser beam between the first pin-hole sensor and the third pin-hole sensor.

8. A system for analyzing laser beam characteristics in high-speed laser motion systems, wherein the characteristics include laser travel speed, velocity, and acceleration, wherein the high-speed laser motion systems comprise a laser for generating a laser beam, comprising:

(a) a first pin-hole sensor positioned within a predetermined field of view of the laser, wherein the first pin-hole sensor has a determined location within the predetermined field of view; and (b) a second pin-hole sensor positioned within the predetermined field of view of the laser, wherein the second pin-hole sensor has a determined location within the predetermined field of view, wherein the determined locations of the first pin-hole sensor and the second pin-hole sensor are used to define a travel distance of the laser beam, wherein the amount of time to travel from the location of the first pin-hole sensor to the location of the second pin-hole sensor is measured, wherein the travel distance is divided by the amount of time to travel from the location of the first pin-hole sensor to the location of the second pin-hole sensor to calculate the velocity of the laser beam between the first pin-hole sensor and the second pin-hole sensor, and wherein the calculated velocity of the laser beam is divided by the amount of time to travel from the location of the first pin-hole sensor to the location of the second pin-hole sensor to calculate the acceleration of the laser beam between the first pin-hole sensor and the second pin-hole sensor.

9. The system of claim 8, wherein the first pin-hole sensor and the second pin-hole sensor are mounted in a portable testing apparatus, wherein each pin-hole is positioned to receive the laser light generated by the non-stationary laser beam, and wherein each pin-hole sensor is elevated at a predetermined height above an upper surface of the portable testing apparatus.

10. The system of claim 8, wherein the system further comprises a third pin-hole sensor positioned within the predetermined field of view, wherein the third pin-hole sensor has a determined location within the predetermined field of view.

11. The system of claim 10, wherein the determined locations of the first pin-hole sensor and the third pin-hole sensor are used to define a second travel distance for the laser beam, and wherein the amount of time to travel from the location of the first pin-hole sensor to the location of the third pin-hole sensor is measured.

12. The system of claim 11, wherein the second travel distance is divided by the amount of time to travel from the location of the first pin-hole sensor to the location of the third pin-hole sensor to calculate the velocity of the laser beam between the first pin-hole sensor and the third pin-hole sensor, and wherein the velocity of the laser beam between the first pin-hole sensor and the second pin-hole sensor is subtracted from the velocity of the laser beam between the first pin-hole sensor and the third pin-hole sensor to calculate a change in velocity of the laser beam.

13. The system of claim 12, wherein the amount of time to travel from the location of the first pin-hole sensor to the location of the second pin-hole sensor is added with the amount of time to travel from the location of the first pin-hole sensor to the location of the third pin-hole sensor to calculate a total measured time.

14. The system of claim 13, wherein the change in velocity of the laser beam is divided by the total measured time to calculate the acceleration of the laser beam between the first pin-hole sensor and the third pin-hole sensor.

15. A system for analyzing laser beam characteristics in high-speed laser motion systems, wherein the characteristics include laser travel speed, velocity, and acceleration, wherein the high-speed laser motion systems comprise a laser for generating a laser beam, the system comprising:

(a) positioning a portable testing apparatus within a predetermined field of view of the laser, wherein the portable testing apparatus includes:

(i) a first pin-hole sensor mounted at a determined location in the portable testing apparatus, wherein the first pin-hole sensor is elevated at a predetermined height above an upper surface of the portable testing apparatus; and (ii) a second pin-hole sensor mounted at a determined location in the portable testing apparatus, wherein the second pin-hole sensor is elevated at a predetermined height above the upper surface of the portable testing apparatus;

(b) using the determined locations of the first pin-hole sensor and the second pin-hole sensor to define a travel distance of the laser beam;

(c) measuring the amount of time to travel from the location of the first pin-hole sensor to the location of the second pin-hole sensor;

(d) dividing the travel distance by the amount of time to travel from the location of the first pin-hole sensor to the location of the second pin-hole sensor to calculate the velocity of the laser beam between the first pin-hole sensor and the second pin-hole sensor; and (e) dividing the calculated velocity of the laser beam by the amount of time to travel from the location of the first pin-hole sensor to the location of the second pin-hole sensor to calculate the acceleration of the laser beam between the first pin-hole sensor and the second pin-hole sensor.

16. The system of claim 15, further comprising a third pin-hole sensor mounted at a determined location in the portable testing apparatus, wherein the first pin-hole sensor is elevated at a predetermined height above an upper surface of the portable testing apparatus.

17. The system of claim 16, wherein the determined locations of the first pin-hole sensor and the third pin-hole sensor are used to define a second travel distance for the laser beam, and wherein the amount of time to travel from the location of the first pin-hole sensor to the location of the third pin-hole sensor is measured.

18. The system of claim 17, wherein the second travel distance is divided by the amount of time to travel from the location of the first pin-hole sensor to the location of the third pin-hole sensor to calculate the velocity of the laser beam between the first pin-hole sensor and the third pin-hole sensor, and wherein the velocity of the laser beam between the first pin-hole sensor and the second pin-hole sensor is subtracted from the velocity of the laser beam between the first pin-hole sensor and the third pin-hole sensor to calculate a change in velocity of the laser beam.

19. The system of claim 18, wherein the amount of time to travel from the location of the first pin-hole sensor to the location of the second pin-hole sensor is added with the amount of time to travel from the location of the first pin-hole sensor to the location of the third pin-hole sensor to calculate a total measured time.

20. The system of claim 19, wherein the change in velocity of the laser beam is divided by the total measured time to calculate the acceleration of the laser beam between the first pin-hole sensor and the third pin-hole sensor.

* * * * *